Oct. 30, 1962 K. LEHOVEC ET AL 3,061,461
CERAMIC BODIES
Filed Dec. 18, 1959

LEAKAGE CURRENT VS TIME
CERAMIC BODIES:
X-PLAIN BODY
O-DIFFUSED BODY

INVENTORS
KURT LEHOVEC
BY GEORGE A. SHIRN
*Connolly and Hutz*
THIER ATTORNEYS

United States Patent Office 3,061,461
Patented Oct. 30, 1962

3,061,461
CERAMIC BODIES
Kurt Lehovec and George A. Shirn, Williamstown, Mass., assignors to Sprague Electric Company, North Adams, Mass., a corporation of Massachusetts
Filed Dec. 18, 1959, Ser. No. 860,538
3 Claims. (Cl. 117—106)

This invention relates to ceramic materials and more particularly to improved bodies of ceramic dielectric material and a method for making the same.

Ceramic materials have wide-spread application in the electrical industry as dielectric bodies. It is well established in the art that the electrical properties of a ceramic body depend on the chemical composition and the grain structure of the body. There is considerable literature in the art dealing with the addition of minor amounts of various chemical ingredients to the ceramic particles from which a ceramic dielectric body is prepared (by sintering) for the purpose of improving electrical properties of the body such as dielectric constant, temperature dependence of the dielectric constant, leakage current, power factor, and stability of electrical properties with time at various temperatures and electric load conditions.

A ceramic body of dielectric material fails because of undesirable change in the body after a period of use under a D.C. voltage load. The electrical properties of ceramic bodies are related in general to the chemical composition and the grain structure of the body. It appears that the electrical failures of a ceramic body arise for the most part from conditions associated with the grain structure of the ceramic material making up the body.

From a detailed study of the mechanism of electrical failures in ceramic bodies, we have concluded that the failure mechanism arises from conditions present at the grain boundaries of the ceramic particles, and that this failure mechanism can be prevented by a chemical treatment directed specifically to the grain boundaries. By restricting the treatment to the grain boundaries, we avoid undesirable changes in other electrical properties which would result if the treatment were applied throughout the entire grain structure of the body.

Changes in electrical properties of ceramic bodies are undesirable for apparent reasons; hence, it is desirable to treat the bodies so as to avoid as many as possible of the changes in electrical properties. Treatment of the ceramic body so that the electrical properties remain stable during use under the stress of an applied D.C. voltage load provides a highly desirable ceramic body having a significantly longer life than present day bodies.

It is an object of this invention to provide an improved ceramic body which is not subject to change in electrical properties during use.

It is another object of this invention to provide a method for increasing the life of ceramic bodies under D.C. electric load and at elevated temperatures.

It is a further object of this invention to provide a method for chemical treatment of grain boundaries in ceramic bodies without significantly affecting the bulk of the grains in that body.

It is a still further object of this invention to provide a method for increasing the life under D.C. load at elevated temperatures of barium titanate type dielectric bodies.

These and other objects of this invention will become more apparent upon consideration of the following description taken together with the accompanying drawing in which.

Figure 1:
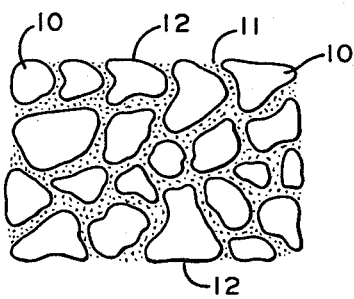
FIG. 1 is a schematic cross-section through a ceramic body constructed according to this invention showing grains of ceramic material and the grain boundaries.

The mechanism which limits the life of ceramic bodies under D.C. voltage at elevated temperatures is not fully understood; however, it is apparent from a comparison of the behavior of a polycrystalline sample to the behavior of a single crystal that the failure mechanism takes place along the grain boundaries of the ceramic body. Study of the mechanism of aging breakdown under D.C. voltage reveals that the breakdown is related to a certain amount of disorder at the grain boundaries. For instance, it is well-known that ionic conduction in ionic salts is increased by vacancies of ions, or by interstitial ions, or generally speaking by ionic disorder. It is also well-known that leakage conductance in electronic semiconductors and insulators is promoted by so-called inversion layers along the surface of these materials, with the inversion layers being due to absorbed ions at the surface which induce mobile electric charges adjacent to the surface.

Generally speaking, the disorder can be introduced by incorporating or absorbing ions of a different valency at or near the surface of the crystals; conversely, the disorder can be reduced by compensating the sources of the disorder by other sources of opposite effect, for example a surface charge of negative absorbed ions can be compensated by absorbing positive ions in an equal amount.

A special case of disorder at grain boundaries is that of a negative surface charge on an ionic crystal which would tend to induce negative ion vacancies adjacent to the crystalline surface. These negative ion vacancies would contribute to an ionic conductance along the surface in the presence of an electric field in that direction. However, all ionic conductance leads to a transfer of material, and thus leads to a chemical dissociation of the material after prolonged use.

This chemical dissociation can be avoided by preventing the presence of negative ion vacancies. One means for preventing the presence of negative ion vacancies comprises compensating the negative surface charge on the grains by the absorption of positive ions. Another means for preventing the presence of negative ion vacancies comprises a substitution of metal ions of high valency for metal ions of low valency in the body; for example, substituting five-valent bismuth for four-valent titanium depresses the concentration of oxygen vacancies in barium titanate.

While these means for preventing the presence of negative ion vacancies are only two of many possible mechanisms by which grain boundary effects can be suppressed, it should be understood that a chemical reaction involving the grain boundaries is necessary for suppression in all cases. It should also be understood that the negative ion vacancy mechanism is not fully understood and should not be construed to limit the scope of this invention, inasmuch as the mechanism is set forth solely for instructional purposes to facilitate others skilled in the art to practice this invention.

In general, the objects of this invention are attained by a process comprising the treatment of a ceramic body at elevated temperatures in a gas containing metal ions to be incorporated along the grain boundaries of the ceramic to improve life at elevated temperatures under applied voltages.

The ceramic bodies treated according to this invention may include any of the well-known capacitor bodies comprising titanates or zirconates of alkaline earth metals, including but not limited to barium titanate and calcium zirconate. The metal ions for incorporation along the grain boundaries comprise members of the fifth column of the periodic table, including but not limited to bismuth.

The attainment of the objectives of this invention is explained with reference to the drawing, wherein FIG. 1 shows crystalline grains 10, for example barium titanate, having grain boundary regions 11. For purposes of illustration, the bulk of each grain is shown at 10 as being a discrete particle having a surface 12, whereas the boundary regions 11 are shown as uniting to form a continuous body. That is, a portion of the material 11 between two grains 10 forms the surface of one grain, and the remainder belongs to the adjacent grain. The grain boundary regions 11 are indicated as having a finite width, in order to emphasize that adjacent to the grain boundaries proper there are regions having a substantially higher degree of crystal imperfections than the bulk 10 of the crystals. It is through these boundary regions 11 that diffusion according to the process of the invention takes place; diffusion does not penetrate beyond surface 12 into the core of the ceramic particles 10.

Figure 2:
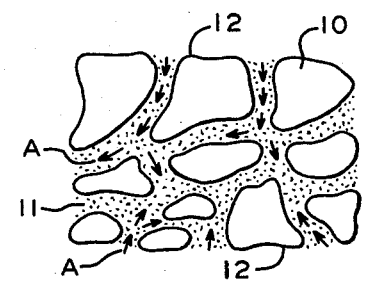
FIG. 2 is a schematic cross-section of the ceramic body of FIG. 1 diagrammatically illustrating the operation of this invention.

One aspect of this invention relates to the chemical reaction within the grain boundary regions 11. This chemical reaction is schematically illustrated in FIG. 2 wherein the path of the material which counteracts the negative surface charge on the grains is shown by the arrows A. This counteracting material passes into the ceramic body along the grain boundaries 11 and penetrates by diffusion in a direction perpendicular to the surfaces 12. The grain boundaries interreact with this counteracting material, and the result is a reduction of the negative ion vacancies. In the preferred embodiment of this invention the counteracting chemical introduced as illustrated by the arrows A in FIG. 2 is bismuth oxide. The bismuth oxide infiltrating the ceramic body along and through the grain boundaries 11 supplants some of the barium titanate in the grain boundary regions. The displacement results in a reduction of the concentration of oxygen vacancies and a suppression of the associated aging effect under D.C. voltage.

Figure 3:
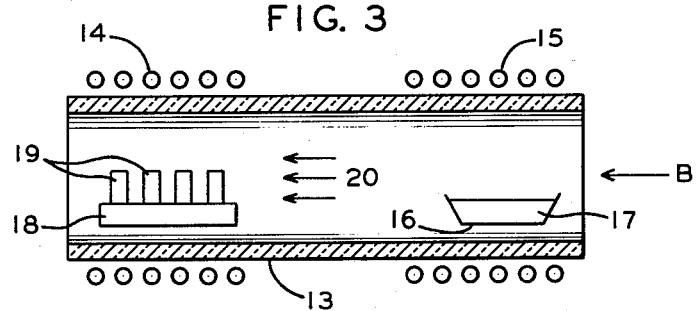
FIG. 3 is a schematic diagram of equipment for carrying out the method of this invention.

An example of a method of bringing about the chemical reaction of the preferred embodiment is illustrated by the schematic diagram of FIG. 3 wherein a furnace tube 13 is shown in axial section. The furnace tube 13 is provided with a pair of heater windings 14 and 15 to produce two controlled temperature zones. The tube 13 is shown as containing a platinum boat 16, which in turn contains a supply of bismuth oxide ($Bi_2O_3$) 17. The boat 16 with the oxide 17 is positioned within the zone of the heater winding 15. Also positioned within the tube 13 is a holder 18 of a refractory such as zirconium oxide. The holder 18 supports suitable ceramic bodies 19 of ceramic material, for example barium titanate, to be treated according to this invention. The holder 18 and the bodies 19 are positioned in the zone of heater winding 14.

Suitable means (not shown) are provided for introducing a stream of gaseous oxygen into the tube 13 from the right side as seen in FIG. 3 and as illustrated by the arrow B. The current of oxygen picks up a vapor of bismuth oxide and forms a cloud 20 of bismuth oxide permeating through the tube 13 from right to left as shown. The bismuth oxide provides an environment of bismuth oxide vapor surrounding the ceramic bodies 19.

The following example illustrates the treatment of ceramic bodies according to this invention with a chemical reaction involving the grain boundaries within the ceramic bodies. This example is set forth for the purpose of illustrating the operation of this invention by use of the apparatus shown in FIG. 3 and is not intended to be limitative.

*Example*

Ceramic bodies of barium titanate having a disc shape and a thickness of 25 mils were positioned in a suitable furnace tube of one-inch diameter as described above. A supply of $Bi_2O_3$ was positioned in a platinum boat (exposed surface area of ½ sq. cm.) within one of the two sets of heater windings. The ceramic bodies were positioned within the zone of the other heater windings. A stream of gaseous oxygen was passed through the tube from the zone of the bismuth oxide to the zone of the ceramic bodies. The oxygen gas stream was at a rate of three cubic feet per hour in the one-inch diameter tube. The gaseous oxygen carried bismuth oxide vapor from the platinum boat to the ceramic bodies. The passage of the bismuth oxide vapor was carried on for 16 hours with a temperature of 1000° C. in the zone of the ceramic bodies and 950° C. in the zone of the bismuth oxide supply. At the end of the period, the treated ceramic bodies were removed from the furnace and permitted to cool. Electrodes of silver paint were screened onto the treated ceramic bodies. The silver was fired in a tunnel kiln with a firing cycle of one hour and having a maximum temperature of 800° C.

Figure 4:
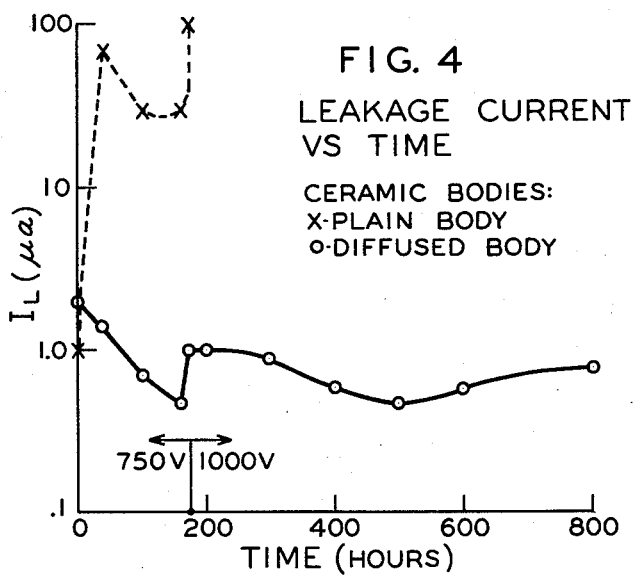
FIG. 4 is a graph of D.C. leakage current versus time at elevated temperatures to show the improved properties of a ceramic body constructed according to the process of this invention.

The silvered bodies were tested for degrees of leakage resistance under a D.C. voltage. The ceramic bodies were subjected to a D.C. voltage of 750 volts for 170 hours. The results were compared with an untreated ceramic body subjected to the same leakage resistance test. The comparative results are illustrated in FIG. 4 wherein the leakage current is plotted on a logarithmic scale against the duration of time of the test to illustrate change in leakage resistance of the ceramic bodies under D.C. voltage as indicated by an increase in the leakage current. After 170 hours the D.C. voltage was increased to 1000 volts and the test was continued for an additional 630 hours (total test of 800 hours). The temperature of the ceramic bodies under the D.C. voltage was 125° C. throughout the entire period of testing. The readings for the untreated ceramic bodies are indicated by "X" on the chart and the readings for the treated ceramic bodies are indicated by "0" on the chart. The leakage current of the untreated bodies is illustrated by a dash line on the chart, whereas the leakage current for the treated bodies are shown by the solid line.

The test results shown in FIG. 4 establish that the process of this invention produces ceramic bodies that exhibit lower leakage current and have greater life than untreated bodies. The 170 hours at 750 volts disclosed that the leakage current in the inventive body was about 50 times less than in the untreated comparison units. The increase in load to 1000 volts disclosed that the untreated bodies burned out in less than one hour, whereas the bodies treated according to this invention maintained a low leakage current for many hundred hours.

As many apparently widely different embodiments of this invention may be made without departing from the spirit and scope hereof, it is to be understood that the invention is not limited to the specific embodiments hereof except as defined in the appended claims.

What is claimed is:

1. A treatment of crystalline grains having boundary regions united to form a continuous ceramic body, said treatment comprising exposing said ceramic body at elevated temperatures to a vapor of an oxide of a metal from the fifth column of the periodic table whereby said vapor is diffused through said ceramic body along the grain boundaries in said ceramic body, whereby said oxide is incorporated along said grain boundaries, but not in a significant amount throughout the bulk of the grains of said body.

2. A treatment according to claim 1 wherein said ceramic body consists essentially of a compound selected from the group consisting of a titanate and a zirconate of an alkaline earth metal.

3. The process of treating crystalline grains, selected from the group consisting of a titanate and a zirconate of an alkaline earth metal, having boundary regions united to form a continuous ceramic body comprising exposing said body to a vapor of bismuth oxide at a temperature of about 1000° C., whereby said oxide diffuses through said ceramic body and is incorporated along said gain boundaries, but not in a significant amount throughout the bulk of the grains of said body.

References Cited in the file of this patent

UNITED STATES PATENTS

| | | |
|---|---|---|
| 2,825,687 | Preston | Mar. 8, 1958 |
| 2,908,579 | Nelson | Oct. 13, 1959 |

FOREIGN PATENTS

| | | |
|---|---|---|
| 789,539 | Great Britain | Jan. 22, 1958 |